Figure 1:
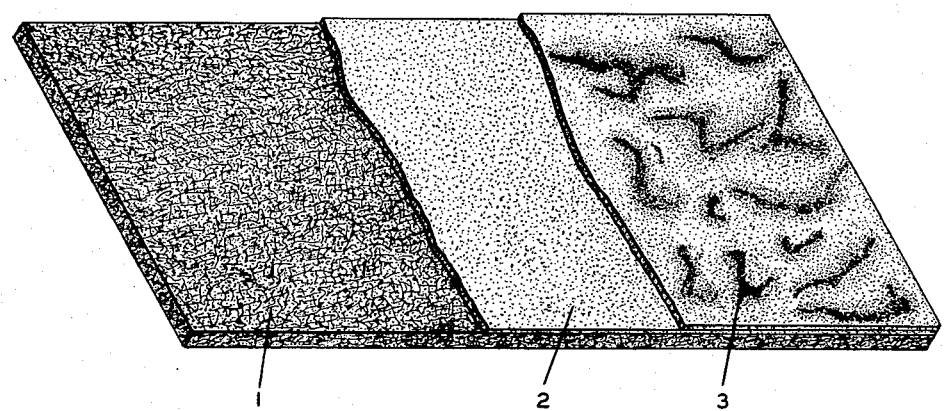

Dec. 7, 1954   I. I. BEZMAN   2,696,447
FELT BASE FLOOR COVERING
Filed May 13, 1952

INVENTOR
IRVING I. BEZMAN
by Walter + Kaufman
ATTORNEY

United States Patent Office 2,696,447
Patented Dec. 7, 1954

2,696,447

FELT BASE FLOOR COVERING

Irving I. Bezman, Pittsburgh, Pa., assignor to Armstrong Cork Company, Lancaster, Pa., a corporation of Pennsylvania Application May 13, 1952, Serial No. 287,516

10 Claims. (Cl. 117—76)

This invention relates to felt base floor coverings. More particularly the invention relates to an improvement in felt base floor coverings having a saturated felt backing; a coating paint containing an inherently tacky compound which serves to enhance the adhesion between the coating paint and the felt and a reinforcing agent, which is a resinous vinyl type polymer and which serves to build up the internal strength of the coating paint and also, because of chemical similarities to the wearing surface, to enhance adhesion between the laminating film and the wearing surface, and an excess of a filler material to enhance laminate strength by affording a microscopically roughened surface; and a decorative or wearing surface containing a vinyl resin.

Felt base floor coverings are well known to the art and are comprised of a saturated felt backing, a seal coat or intermediate coat, and a paint film which serves as both a decorative and wearing surface. These floor coverings are to be distinguished from linoleum, inasmuch as in the manufacture of linoleum, the mix, which is comprised of oxidized and polymerized siccative oil-resin gel, pigments, and fillers, is deposited upon a backing which may be of burlap or saturated felt. The linoleum type floor coverings are, generally speaking, more expensive and much longer wearing, because the comparatively thick coating of cured linoleum mix constitutes the wearing and decorative surface in contrast to the relatively thin paint film which constitutes the wearing and decorative surface of felt base goods. However, felt base floor coverings are widely used as resilient hard surface flooring materials.

Considerable research has been devoted to the development of improved surface coatings for use in the manufacture of felt base floor coverings. Recently, various types of resin formulations have been proposed for use as the wearing and decorative surface of such hard surface floor coverings. Such materials are, generally speaking, more suitable than the older paint films because they are characterized by better color, increased durability, and increased resistance to alkalies such as are normally encountered in soaps and cleaning preparations. One class of materials which has been suggested as a decorative coating for felt base goods is the class of vinyl resins. There are numerous well-known examples of vinyl resins. Probably the most widely known are copolymers of vinyl chloride and vinyl acetate. Generally speaking, the commercially available copolymers contain from about 5% to 15% by weight of polymerized vinyl acetate. Other vinyl resins include polyvinyl chloride, copolymers of vinyl chloride and vinylidene chloride, maleic anhydride, modified polyvinyl chloride, and the like. Although these vinyl resins do exhibit excellent properties as far as resistance to alkali and improved color characteristics are concerned, it has been exceedingly difficult to obtain a felt base floor covering in which the vinyl resin decorative coat "keys" strongly to the impregnated felt base. The various paint coats which are normally employed on saturated felt do not possess sufficient adhesion to the vinyl resin decorative coatings to retain them in place on the surface of the floor coverings. For instance, it is possible with the normal coating paint, which is comprised of the product resulting from the oxidation and polymerization of a drying oil, such as linseed oil, soya bean oil, dehydrated castor oil, tung oil, and the like, in the presence of a resin, such as rosin, copal resin, ester gum, and the like, to strip completely a vinyl resin decorative coating from the finished product with little effort.

In copending application Serial No. 277,584, filed March 20, 1952, by myself and Daniel D. Browning, there is disclosed and claimed a felt base floor covering comprised of a saturated felt backing carrying a coating paint containing three essential ingredients. Over the coated felt is provided a vinyl resin decorative coating. The resulting floor covering is characterized by excellent resistance to alkali, and the coating paint is capable of securely holding the decorative vinyl resin coating in place due to the excellent adhesive properties of the coating paint. In one embodiment of that invention, a saturated felt backing is provided, to which is applied an intermediate coating containing a rubberlike component as a tackifier, a resinous component as a reinforcer, and an excess of filler. Generally speaking, advantageous results are obtained when the adhesive coating paint contains about 20% to about 50% rubberlike polymer-resin and about 80% to about 50% inert filler; the binder mixture advantageously contains about 25% to 80% rubberlike polymer and about 75% to 20% reinforcing resin. If less than about 25% rubberlike polymer is employed, the coating paint does not key well to the saturated felt base. If less than about 20% reinforcing resin is contained in the coating paint, a good key between the paint and the vinyl resin decorative coat is not obtained. As to the quantity of inert filler, it was found that with less than about 50% filler the desired "tooth" or mechanical bond between the coating paint and adjacent surfaces is not obtained. However, when more than about 80% filler is used, the coating paint possesses very little internal strength.

I have found that the compositions of the above-identified copending application can be extended by providing in the coating paint binder about 20% to about 60% by weight of rosin compounds. The term "rosin compound" as employed herein is intended to include rosin fractions and alkaline dispersions of stabilized rosin and rosin derivatives. Typical of the rosin fractions is the extracted pine wood pitch resin which comprises a residue low in abietic acid remaining after separation of refined rosin high in abietic acid from the resinous material obtained by extraction of pine wood with a solvent. A commercial variety of such a resin is presently sold under the trade name "Vinsol." Typical of the alkaline dispersions are: a 40% solids ammoniacal dispersion of a dark wood rosin stabilized with an animal protein and sold under the trade name "Dresinol 238"; a 40% solids ammoniacal dispersion of a partially decarboxylated pale gum rosin having an acid number of 100 to 105, stabilized with animal protein and sold under the trade name "Dresinol 42"; and a 45% solids ammoniacal dispersion of a plasticized hydrogenated pale wood rosin stabilized with an animal protein and sold under the trade name "Dresinol 210B."

In addition to the rosin compound as described above, the adhesive coating paint binder contains a mixture of rubberlike polymer and reinforcing agent as described in the above-identified copending application.

Examples of rubberlike polymers, which are tackifiers, and reinforcing agents which may be employed in the production of the adhesive coating paint of this invention are as follows:

A. Tackifiers

1. A styrene-butadiene copolymer containing 30–60 parts of styrene and 70–40 parts of butadiene.
2. An acrylonitrile-butadiene copolymer containing 55–80 parts of butadiene and 45–20 parts of acrylonitrile.
3. An isobutylene-isoprene copolymer containing 97–99 parts of isobutylene with 3–1 parts of isoprene.
4. A polychloroprene.

B. Reinforcing agents

1. Polyvinyl chloride.
2. A copolymer of polyvinyl chloride and polyvinyl acetate containing 95–80 parts of polyvinyl chloride with 5–20 parts of polyvinyl acetate.

3. A polyvinyl chloride-polyvinylidene chloride copolymer containing a majority of polyvinylidene chloride.

4. A styrene-butadiene copolymer containing 98–80 parts of styrene with 2–20 parts of butadiene.

5. Polystyrene.

Various combinations of tackifier with reinforcing agent have been used and found to be successful for the purpose. The preferred binder formulations contain 35–60 parts of polyvinyl chloride with 65–40 parts of a butadiene-acrylonitrile copolymer containing 65 parts of butadiene and 35 parts of acrylonitrile. Best results were obtained with a ratio of 55 parts of polyvinyl chloride together with 45 parts of the butadiene-acrylonitrile copolymer. A second preferred composition contains 50–80 parts of a butadiene-acrylonitrile copolymer (65 parts of butadiene—35 parts of acrylonitrile) with 50–20 parts of a resinous copolymer of vinyl chloride and vinylidene chloride. Best results were obtained with a ratio of 70 parts of the butadiene-acrylonitrile copolymer together with 30 parts of resinous copolymer.

In producing the adhesive coating paint of this invention, the composition contains about 20–50% binder which includes the rubberlike butadiene polymer, reinforcing agents, and a rosin compound, and about 80% to about 50% inert filler. For example, about 1 to 3 parts of an inert filler such as wood flour, micronized slate, whiting, clay, and the like, are employed for 1 part of the binder of the coating composition. Advantageously, the binder contains about 20% to about 60% rosin compound and about 80% to about 40% of the rubberlike polymer-reinforcing resin mixture.

In accordance with one embodiment of my invention, which is illustrated in Figure 1, the backing 1 may be felt saturated with any of the usual saturants, such as asphalt, rubber, synthetic rubbers, blends of asphalt and rubber, and the like. If desired, the saturation may be carried out by passing a web of felt obtained from a papermaking machine through a bath containing the desired saturant. On the other hand, we may utilize a saturated felt prepared by a beater saturation process. For example, the papermaking fibers may be suspended in a beater containing the desired saturants, such as butadiene-styrene copolymer, butadiene-acrylonitrile copolymer, polymer of chloroprene, natural rubber, and the like; and the rubberlike solids may then be deposited upon the fibers by coagulation using known coagulants such as papermakers' alum. The resulting coated fibers are then formed on a wire to obtain the sheet having the saturant therein. To this backing of saturated felt is applied the adhesive coating paint 2 described above. Generally speaking, the application is by means of a doctor blade. In fact, in compounding the coating paint an aqueous dispersion of each of the components is used. If desired, roll coating may be used to obtain the coating. After the saturated felt is coated with the composition as described hereinabove, the water is driven off by heating at slightly elevated temperatures such as about 70° C. to 90° C. Generally speaking, a period of about five minutes to two hours is required to remove the desired amount of water.

Following the application of the coating paint to the impregnated felt backing as indicated above, the resulting material can be coated with a decorative wearing surface 3 and heated at elevated temperatures such as about 165° C. to flux the vinyl coating. The heating step also serves to improve the bond between the saturated felt base and the coating paint and the wearing surface coating.

Figure 2:
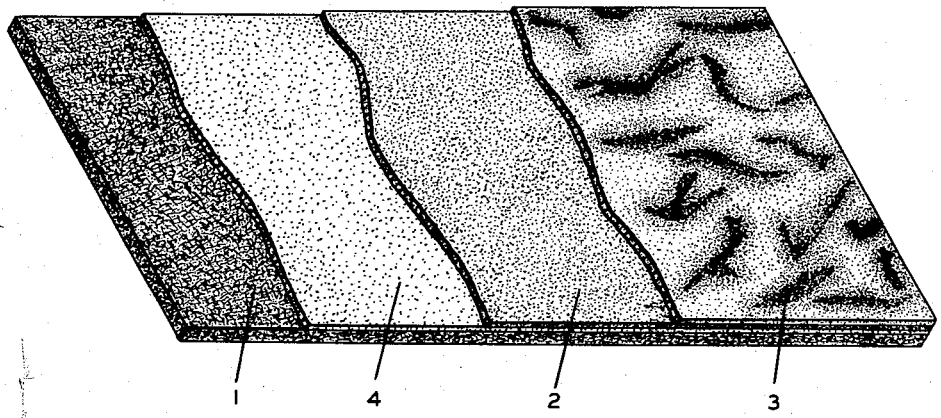

In another embodiment of my invention illustrated in Figure 2, the saturated felt is first coated with a conventional drying oil-resin gel coat. Over this coat is applied the adhesive coating paint described above. Following application of the coating paint, a vinyl resin decorative film is then applied. In Figure 2, 1 designates saturated felt backing, 2 the coating paint, 3 the decorative vinyl resin coat, and 4 a conventional drying oil-resin gel coating.

The following specific examples are typical of the preparation of the adhesive coating paint employed in the practice of my invention.

*Example I*

2 parts by weight of Darvan #1 (sodium salt of polymerized alkyl aryl sulfonic acid) and 2 parts by weight of tetrasodium pyrophosphate are dissolved in 86 parts by weight of water. 200 parts by weight of clay are then added and the mixture is ball milled for a period of at least five hours. After the clay slurry is removed from the ball mill, its pH is adjusted to 7–10 by means of small additions of ammonium hydroxide (10% solution). The clay slurry is then mixed with 35 parts by weight of polyvinyl chloride resin latex (50% solids), 65 parts by weight of butadiene-acrylonitrile rubber latex (50% solids), and 100 parts by weight of an aqueous emulsion of "Vinsol" (40% solids); and a small amount (approximately 1 cc. per pound of formulation) of octyl alcohol is added as an antifoam agent.

*Example II*

30 parts by weight of a polystyrene resin latex (50% solids) and 70 parts by weight of a styrene-butadiene copolymer resin latex (50% solids) are blended. Thereafter, 100 parts by weight of "Dresinol 210B" are added. Thereafter, 3 parts by weight of Darvan #1 (sodium salt of polymerized alkyl aryl sulfonic acid) and 3 parts by weight of tetrasodium pyrophosphate are added, together with sufficient ammonium hydroxide (10% solution) to maintain the pH of the mixture at 7–10. 300 parts by weight of slate flour are added to the resulting mixture, and the material is stirred slightly in order to wet down the dry mix. The mixture is then placed in a ball mill and ground for a period of about five hours. If the formulation is foamed upon removal from the ball mill, this condition can be almost completely eliminated by standing or the addition of a small amount (about 1 cc. per pound of formulation) of octyl alcohol.

Products resulting from the practice of my invention are characterized by excellent color of the decorative surface as well as a bond between the various coatings and between the coating paint and the saturated felt backing.

As used herein, the term "rubberlike polymers" or its equivalent is intended to include the well-known rubberlike polymers typified by butadiene-styrene copolymers, butadiene-acrylonitrile copolymers, isobutylene, isoprene copolymers, and the like. The quantity of each ingredient in the copolymer is not a part of this invention, but such quantities are well known to the art. For example, it is well known in the synthetic rubber art that a typical range of butadiene concentration in mixture subjected through emulsion polymerization to form butadiene-styrene copolymers is a mixture containing between about 40% and 75% butadiene, the remainder being styrene or its equivalent. In the case of butadiene-acrylonitrile copolymers, generally speaking, between about 50% to 75% butadiene is employed in the mixture subjected to emulsion polymerization. Generally speaking, in the production of isobutylene, isoprene copolymers, comparatively small amounts of isoprene are used, such as 1 to 3 parts isoprene, and such amounts are copolymerized with between about 97 and 99 parts of isobutylene.

The vinyl resin decorative wearing surface of the floor coverings of my invention may be any well-known vinyl resin coating material. Typical examples are polyvinyl chloride coatings, vinyl chloride-vinyl acetate copolymers containing about 5% to 15% by weight polymerized vinyl acetate. Other vinyl resins include copolymers of vinyl chloride and vinylidene chloride, maleic anhydride, modified polyvinyl chloride, and the like.

I claim:

1. A floor covering comprising a saturated felt backing; an adhesive coating paint containing about 50% to about 80% by weight of an inert filler and about 50% to about 20% by weight of a composition containing about 20% to about 60% by weight of a rosin compound and about 80% to about 40% by weight of a mixture of a vinyl resin and a rubberlike polymer; and a decorative wearing surface containing a vinyl resin.

2. A floor covering comprising a saturated felt backing carrying a drying oil resin-gel coat, said coating having applied thereto a coating paint containing about 50% to about 80% by weight of an inert filler, about 50% to about 20% by weight of a composition containing about 20% to about 60% by weight of a rosin compound and about 80% to about 40% by weight of a material containing a rubberlike polymer and a vinyl resin, said floor covering having a decorative wearing surface containing a vinyl resin.

3. A felt base floor covering comprising a saturated felt backing and an adhesive coating paint containing about 50% to about 80% by weight of an inert filler and about 50% to about 20% by weight of a composition containing about 20% to about 60% by weight of extracted pine wood pitch resin and about 80% to about 40% by weight of a composition containing a rubberlike butadiene polymer and a resinous vinyl polymer, said floor covering having a decorative wearing surface containing a vinyl resin.

4. A felt base floor covering comprising a saturated felt backing and an adhesive coating paint containing about 50% to about 80% by weight of an inert filler and about 50% to about 20% by weight of a composition containing about 20% to about 60% by weight of an alkaline dispersion of stabilized rosin and about 80% to about 40% by weight of a composition containing a rubberlike butadiene polymer and a resinous vinyl polymer, said floor covering having a decorative wearing surface containing a vinyl resin.

5. A felt base floor covering comprising a saturated felt backing and an adhesive coating paint containing about 50% to about 80% by weight of an inert filler and about 50% to about 20% by weight of a composition containing about 20% to about 60% by weight of an alkaline dispersion of stabilized rosin derivatives and about 80% to about 40% by weight of a composition containing a rubberlike butadiene polymer and a resinous vinyl polymer, said floor covering having a decorative wearing surface containing a vinyl resin.

6. A felt base floor covering comprising a saturated felt backing; an adhesive coating paint containing about 50% to about 80% by weight of an inert filler and about 50% to about 20% by weight of a composition containing about 20% to about 60% by weight of a rosin compound and about 80% to about 40% by weight of a mixture containing about 25% to about 80% by weight thereof of a rubberlike polymer and about 75% to about 20% by weight thereof of a vinyl resin; and a decorative wearing surface containing a vinyl resin.

7. A felt base floor covering comprising a saturated felt backing; an adhesive coating paint containing about 50% to about 80% by weight of an inert filler and about 50% to about 20% by weight of a composition containing about 50% to 60% by weight of a rosin compound and about 40% to 50% by weight of a material containing about 25% to about 80% by weight thereof of a butadiene-acrylonitrile rubber and about 75% to about 20% by weight thereof of polyvinyl chloride; and a decorative wearing surface coating containing a vinyl resin.

8. A felt base floor covering comprising a saturated felt backing; an adhesive coating paint containing about 50% to about 80% by weight of an inert filler and about 50% to about 20% by weight of a binder containing about 20% to about 60% by weight of extracted pine wood pitch resin and about 80% to about 40% by weight of a mixture containing about 25% to about 80% by weight thereof of a rubberlike polymer and about 75% to about 20% by weight thereof of a vinyl resin; and a decorative wearing surface containing a vinyl resin.

9. A felt base floor covering comprising a saturated felt backing; an adhesive coating paint containing about 50% to about 80% by weight of an inert filler and about 50% to about 20% by weight of a binder containing about 20% to about 60% by weight of alkaline dispersion of stabilized rosin and about 80% to about 40% by weight of a mixture containing about 25% to about 80% by weight thereof of a rubberlike polymer and about 75% to about 20% by weight thereof of a vinyl resin; and a decorative wearing surface containing a vinyl resin.

10. A felt base floor covering comprising a saturated felt backing; an adhesive coating paint containing about 50% to about 80% by weight of an inert filler and about 50% to about 20% by weight of a binder containing about 20% to about 60% by weight of alkaline dispersion of stabilized rosin derivatives and about 80% to about 40% by weight of a mixture containing about 25% to about 80% by weight thereof of a rubberlike polymer and about 75% to about 20% by weight thereof of a vinyl resin; and a decorative wearing surface containing a vinyl resin.

References Cited in the file of this patent

UNITED STATES PATENTS

| Number | Name | Date |
|---|---|---|
| 2,330,353 | Henderson | Sept. 28, 1943 |
| 2,382,731 | Little | Aug. 14, 1945 |
| 2,409,276 | Harvey | Oct. 15, 1946 |
| 2,430,934 | Kemmler et al. | Nov. 18, 1947 |
| 2,556,885 | Bess | June 12, 1951 |
| 2,589,502 | Lurie | Mar. 18, 1952 |

FOREIGN PATENTS

| Number | Country | Date |
|---|---|---|
| 552,500 | Great Britain | Apr. 12, 1943 |